(12) United States Patent
Lin et al.

(10) Patent No.: US 11,899,223 B2
(45) Date of Patent: Feb. 13, 2024

(54) OPTICAL DEVICE

(71) Applicant: VisEra Technologies Company Limited, Hsin-Chu (TW)

(72) Inventors: Kuo-Feng Lin, Kaohsiung (TW); Yu-Ping Tseng, Tainan (TW); Chin-Chuan Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 360 days.

(21) Appl. No.: 17/328,681

(22) Filed: May 24, 2021

(65) Prior Publication Data

US 2022/0373719 A1 Nov. 24, 2022

(51) Int. Cl.
*G02B 3/00* (2006.01)
*G02B 5/18* (2006.01)

(52) U.S. Cl.
CPC ............. *G02B 3/00* (2013.01); *G02B 5/1809* (2013.01); *G02B 5/1876* (2013.01)

(58) Field of Classification Search
CPC ...... G02B 3/00; G02B 5/1809; G02B 5/1876; G02B 1/002; G02B 3/08; G02B 1/11; G02B 1/14; G02B 3/0043
USPC .......................................................... 359/741
See application file for complete search history.

(56) References Cited

U.S. PATENT DOCUMENTS

| | | |
|---|---|---|
| 2006/0132920 A1 | 6/2006 | Kleemann |
| 2016/0299337 A1 | 10/2016 | Arbabi et al. |
| 2017/0082263 A1 | 3/2017 | Byrnes et al. |
| 2018/0217395 A1* | 8/2018 | Lin .................... G02B 1/111 |

FOREIGN PATENT DOCUMENTS

| | | |
|---|---|---|
| CN | 109152259 A | 1/2019 |
| EP | 0649036 A1 | 4/1995 |
| EP | 0649037 A2 | 4/1995 |
| JP | 2019086765 A | 6/2019 |
| JP | 2021071727 A | 5/2021 |
| KR | 10-2019-0052544 | 5/2019 |

(Continued)

OTHER PUBLICATIONS

Chen, Flat Optics with Dispersion-Engineered Metasurfaces: Pub date: Jun. 19, 2020 : Nature Review Materials, vol. 5, pp. 604-620 (2020) (Year: 2020).*

(Continued)

*Primary Examiner* — Wyatt A Stoffa
*Assistant Examiner* — Mitchell T Oestreich
(74) *Attorney, Agent, or Firm* — MUNCY, GEISSLER, OLDS & LOWE, P.C.

(57) ABSTRACT

An optical device is provided. The optical device has a central region and a first-type region surrounding the central region. The first-type region includes a first sub-region and a second sub-region between the central region and the first sub-region. The optical device includes a substrate. The optical device also includes a meta-structure disposed on the substrate. The meta-structure includes first pillars in the first sub-region and second pillars in the second sub-region. In the cross-sectional view of the optical device along the radial direction of the optical device, two adjacent first pillars have a first pitch, two adjacent second pillars have a second pitch, and the second pitch is greater than the first pitch.

16 Claims, 5 Drawing Sheets

(56) References Cited

FOREIGN PATENT DOCUMENTS

| KR | 10-2020-0047612 | 5/2020 |
| KR | 20200067074 A | 6/2020 |
| KR | 10-2021-0052177 | 5/2021 |
| TW | I341927 | 5/2011 |
| WO | WO2004102232 A1 | 11/2004 |
| WO | WO2011093893 A1 | 8/2011 |

OTHER PUBLICATIONS

Zhang, Ultra-Thin High-Efficiency Mid-Infrared Transmissive Huygens Meta-Optics : Nature Communications, vol. 9, p. 1481 (2018) (Year: 2018).*
Ray, Doctoral Thesis—Polarization Spectroscopy of Plasmonic Metamaterials , Indian Institute of Science Education and Research, Kolkata India (2019)) (Year: 2019).*
Zeng, Electrically tunable graphene plasmonic quasicrystal metasurfaces for transformation optics : Scientific Reports, vol. 4, p. 5763 (2014) (Year: 2014).*
Banerji, Imaging with Flat Optics: Metalenses or Diffractive Lenses? : Optica, vol. 6, pp. 805-810 (2019) (Year: 2019).*
Engelberg & Levy, The Advantages of Metalenses Over Diffractive Lenses, Nature Communications 11, 1991 (2020) (Year: 2020).*
Office Action of JP Application No. 2021-181040 dated Jan. 17, 2023 and English translation, 8 pages.
Office Action of its corresponding KR application No. 10-2021-0127427 dated May 1, 2023 with its English translation; pp. 1-9.
Office Action with the search report of its corresponding TW application No. 111111789 dated Jun. 6, 2023; pp. 1-7.

* cited by examiner

OPTICAL DEVICE

BACKGROUND

Technical Field

Embodiments of the present disclosure relate to an optical device, and in particular they relate to an optical device that includes a meta-structure having different pitches.

Description of the Related Art

Generally, conventional optical lenses, such as color filters, light-focusing lenses, and beam splitters, have to be combined together to provide specific functionality. Moreover, in order to eliminate the chromatic effect (which degrades their performance in full-color imaging applications), designers have to integrate several lenses with opposite dispersion together. These conventional optical lenses may make the final device using them bulky.

In recent years, a thin lens with focusing effect, which is called meta-lens, has been developed. The meta-lens has nano-structures using high refractive index materials to change optical phase. This structure greatly improves the volume and weight of conventional optical lenses.

However, existing meta-lenses have not been satisfactory in every respect. For example, general meta-lens structures have pillars with a constant (or fixed) pitch size in every region (e.g., edge or peripheral region). This may cause a drop in the efficiency of light-collection.

SUMMARY

In the meta-lenses, a specific region scheme is defined for a specific deflection angle of light by the number of pillars, process limitation (spacing), scaling factor, etc. According to the embodiments of the present disclosure, an optical device that includes a meta-structure having different pitches is provided, such that the efficiency of light-collection may be enhanced.

Some embodiments of the present disclosure include an optical device. The optical device has a central region and a first-type region surrounding the central region. The first-type region includes a first sub-region and a second sub-region between the central region and the first sub-region. The optical device includes a substrate. The optical device also includes a meta-structure disposed on the substrate. The meta-structure includes first pillars in the first sub-region and second pillars in the second sub-region. In the cross-sectional view of the optical device along the radial direction of the optical device, two adjacent first pillars have a first pitch, two adjacent second pillars have a second pitch, and the second pitch is greater than the first pitch.

In some embodiments, in the cross-sectional view of the optical device along the radial direction of the optical device, the number of first pillars is the same as the number of second pillars.

In some embodiments, in the cross-sectional view of the optical device along the radial direction of the optical device, the first sub-region has a first region width, the second sub-region has a second region width, and the second region width is greater than the first region width.

In some embodiments, in the cross-sectional view of the optical device along the radial direction of the optical device, the first pillars have different widths, and the second pillars have different widths.

In some embodiments, the first pillars include a first specific pillar and a second specific pillar adjacent to the first specific pillar, the first specific pillar is closer to the second sub-region than the second specific pillar, and the width of the first specific pillar is greater than the width of the second specific pillar.

In some embodiments, the second pillars include a third specific pillar that corresponds to the first specific pillar and a fourth specific pillar that corresponds to the third specific pillar, and the width of the third specific pillar is greater than the width of the fourth specific pillar.

In some embodiments, the width of the third specific pillar is greater than the width of the first specific pillar.

In some embodiments, the width of the fourth specific pillar is greater than the width of the second specific pillar.

In some embodiments, the optical device further has a second-type region between the central region and the first-type region, and the second-type region includes third sub-regions. The meta-structure further includes third pillars in each third sub-region.

In some embodiments, in the cross-sectional view of the optical device along the radial direction of the optical device, the number of third pillars in each third sub-region is greater than the number of first pillars and the number of second pillars.

In some embodiments, in the cross-sectional view of the optical device along the radial direction of the optical device, the third pillars in each third sub-region have different widths In some embodiments, in the cross-sectional view of the optical device along the radial direction of the optical device, the maximum width of the third pillars is greater than the maximum width of the first pillars.

In some embodiments, the height of each third pillar is lower than the height of each first pillar and each second pillar.

In some embodiments, light vertically entering the second-type region deviates from the normal line of the optical device by 15 degrees or less after passing through the second-type region.

In some embodiments, the number of first pillars and the number of second pillars are equal to or greater than four.

In some embodiments, the optical device further includes a Fresnel lens disposed adjacent to the meta-structure, and the Fresnel lens is located in the central region.

In some embodiments, the optical device further includes an antireflection layer disposed on the meta-structure.

In some embodiments, the optical device further includes a protective layer disposed between the substrate and the antireflection layer.

BRIEF DESCRIPTION OF THE DRAWINGS

Aspects of the embodiments of the present disclosure can be understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
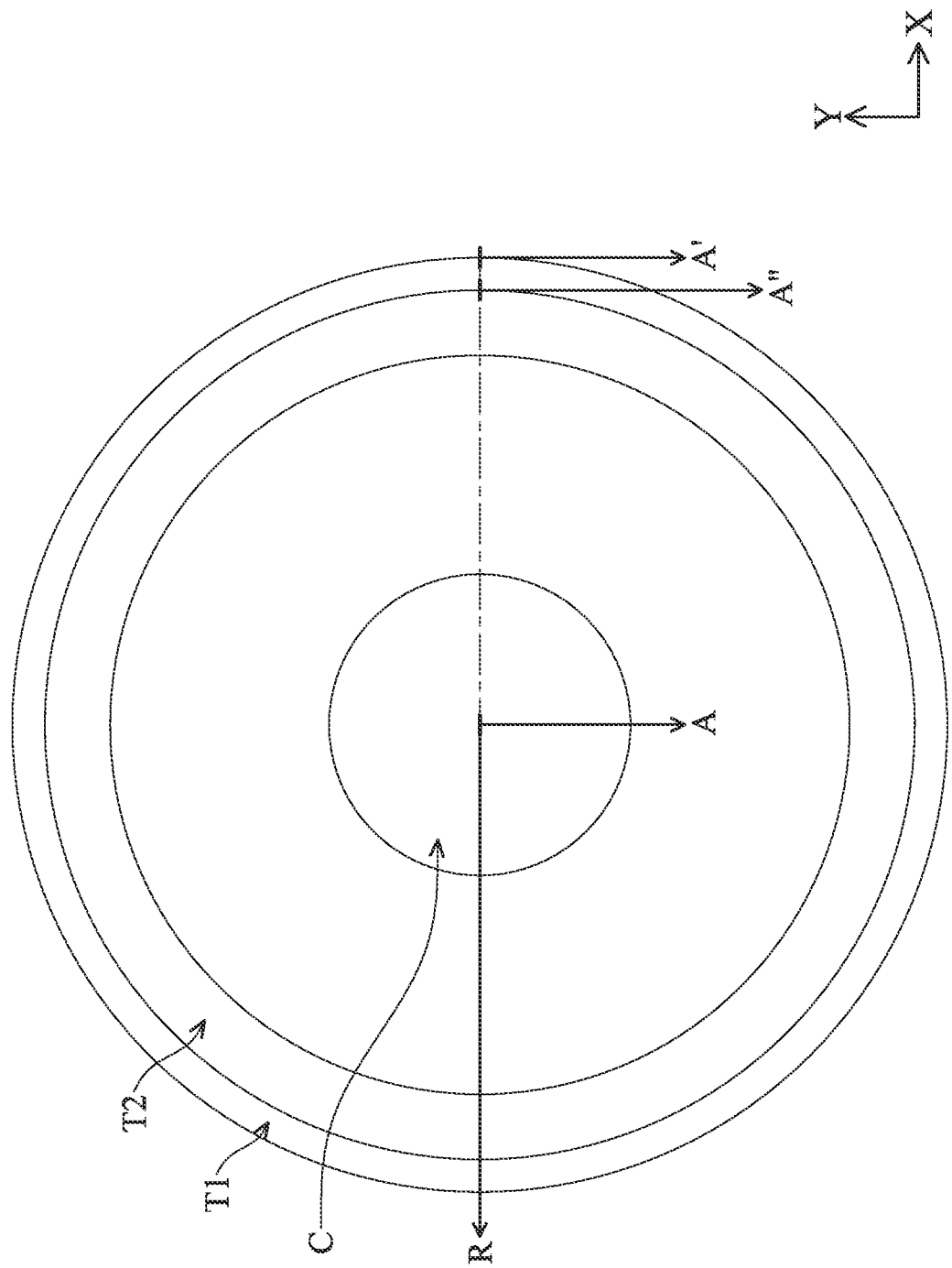
FIG. 1 is a partial top view illustrating an optical device according to an embodiment of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about." "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

Figure 2:
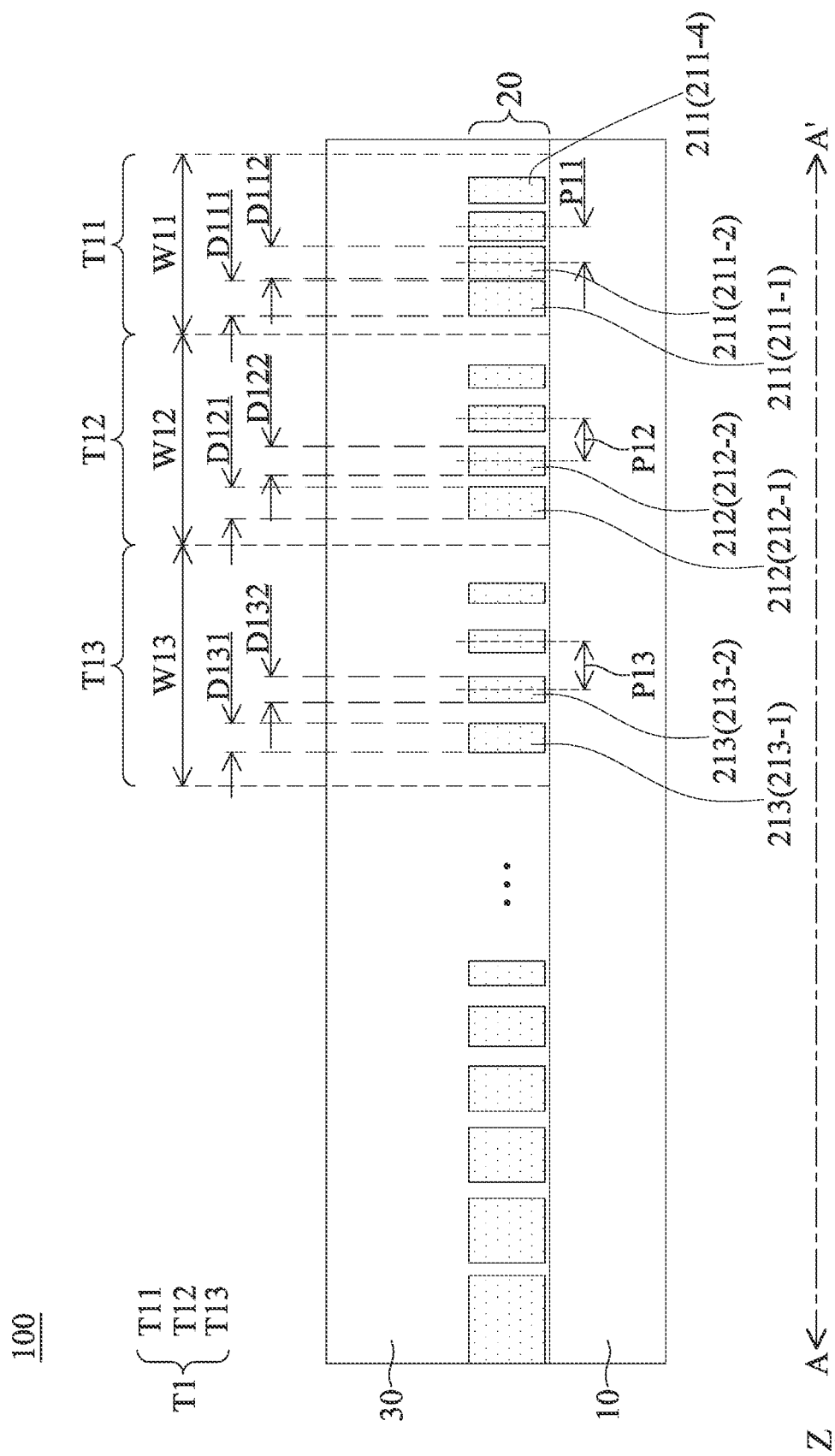
FIG. 2 is a partial cross-sectional view of the optical device along line A-A'.
Figure 3:
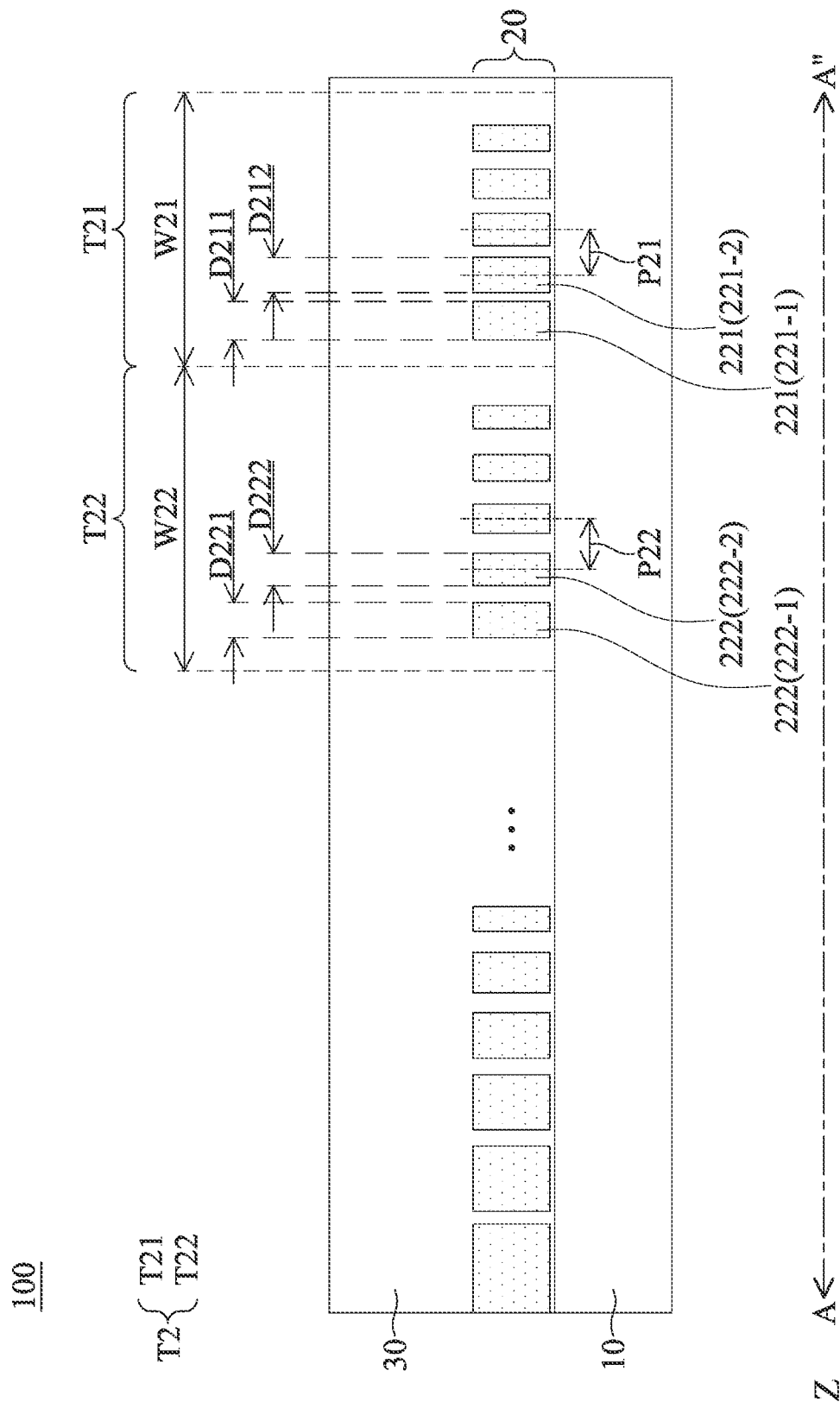
FIG. 3 is a partial cross-sectional view of the optical device along line A-A".

FIG. 1 is a partial top view illustrating an optical device 100 according to an embodiment of the present disclosure. FIG. 2 is a partial cross-sectional view of the optical device 100 along line A-A'. FIG. 3 is a partial cross-sectional view of the optical device 100 along line A-A'. It should be noted that some components of the optical device 100 may be omitted in FIG. 1, FIG. 2 and FIG. 3, for the sake of brevity.

Referring to FIG. 1, in some embodiments, the optical device 100 has (or may be divided into) a central region C and a first-type region T1 that surrounds the central region. For example, the first-type region T1 may be located in the edge (peripheral) region of the optical device 100. In some embodiments, the top view of the optical device 100 is circular. For example, the diameter of the optical device 100 may be in the range from about 10 μm to about 3000 μm, but the present disclosure is not limited thereto.

In some embodiments, the first-type region T1 includes a plurality of sub-regions. For example, as shown in FIG. 2, the first-type region T1 may include a sub-region T11, a sub-region T12 between the central region C and the sub-region T11, and a sub-region T13 between the central region C and the sub-region T12, but the present disclosure is not limited thereto. The number of sub-regions of the first-type region T1 may be, for example, more than sixty, which may be determined according to actual needs or the process limits.

Referring to FIG. 2, in some embodiments, the optical device 100 includes a substrate 10. For example, the substrate 10 may include silicon oxide ($SiO_2$), polymers that have a refractive index of about 1.5 (e.g., polymethylmethacrylate (PMMA), polydimethylsiloxane (PDMS), polymethylpentene (PMP)), or a combination thereof, but the present disclosure is not limited thereto. Alternately, the substrate 10 may be a semiconductor-on-insulator (SOI) substrate.

Referring to FIG. 2, in some embodiments, the optical device 100 includes a meta-structure 20 disposed on the substrate 10. In some embodiments, the meta-structure 20 includes a plurality of pillars 211 in the sub-region T11 and a plurality of pillars 212 in the sub-region T12. For example, each pillar 211 or each pillar 212 may include single crystal silicon, polycrystalline silicon (poly Si), amorphous silicon, $Si_3N_4$, GaP, $TiO_2$, AlSb, AlAs, AlGaAs, AlGaInP, BP, $ZnGeP_2$, any other applicable material, or a combination thereof, but the present disclosure is not limited thereto.

In a cross-sectional view of the optical device 100 along the radial direction R of the optical device 100 (e.g., the cross-sectional view of the optical device 100 shown in FIG. 2), the pillars in the same sub-region may have the same pitch. For example, as shown in FIG. 2, the pillars 211 in the sub-region T11 may have a pitch of P11, and the pillars 212 in the sub-region T12 may have a pitch of P12.

In some embodiments, two adjacent pillars 211 (e.g., the pillar 211-1 and the pillar 211-2) have a pitch of P11, two adjacent pillars 212 (e.g., the pillar 212-1 and the pillar 212-2) have a pitch of P12, and the pitch P12 is greater than the pitch P11. Here, the pitch P11 may be defined as the distance from the central axis of one pillar 211 to the central axis of the adjacent pillar 211. Similarly, the pitch P12 may be defined as the distance from the central axis of one pillar 212 to the central axis of the adjacent pillar 212.

In some embodiments, in the cross-sectional view of the optical device 100 along the radial direction R of the optical device 100 (e.g., the cross-sectional view of the optical device 100 shown in FIG. 2), the number of pillars in each sub-region of the first-type region T1 is the same. For example, as shown in FIG. 2, there are four pillars 211 in the sub-region T11, and there are four pillars 212 in the sub-region T12, but the present disclosure is not limited thereto. In some other embodiments, there may be more than four pillars 211 in the sub-region T11 and more than four pillars 212 in the sub-region T12.

In some embodiments, in the cross-sectional view of the optical device 100 along the radial direction R of the optical device 100 (e.g., the cross-sectional view of the optical device 100 shown in FIG. 2), the sub-region T1l has a region width of W11, the sub-region T12 has a region width of W12, and the region width W12 is greater than the region width W11. In some embodiments, the pitch P11 and the pitch P12 are determined according to the region width W11 of the sub-region T11 and the region width W12 of the sub-region T12, respectively. The region width W11 of the sub-region T11 and the region width W12 of the sub-region T12 may be defined for a specific deflection angle of light.

In some embodiments, in the cross-sectional view of the optical device 100 along the radial direction R of the optical device 100 (e.g., the cross-sectional view of the optical device 100 shown in FIG. 2), the pillars 211 in the sub-region T11 have different widths, and the pillars 212 in the sub-region T12 have different widths. For example, the top surfaces of the pillars 211 and the pillars 212 may have circular shapes, and the diameters of the circular shapes may vary. The diameters of the circular shapes may vary in the range from about 0.15 μm to about 0.30 μm, but the present disclosure is not limited thereto.

In some embodiments, as shown in FIG. 2, the pillar 211-1 is closer to the sub-region T12 than the pillar 211-2, and the width D111 of the pillar 211-1 is greater than the width D112 of the pillar 211-2. Moreover, the pillar 211-2 is closer to the sub-region T12 than the pillar 211-4, and the width D112 of the pillar 211-2 is greater than the width of the pillar 211-4 (not annotated in FIG. 2). That is, the closer the pillar 211 is to the central region C (or the sub-region T12), the greater its width.

In some embodiments, as shown in FIG. 2, the pillar 212-1 in the sub-region T12 corresponds to the pillar 211-1 in the sub-region T11, the pillar 212-2 in the sub-region T12 corresponds to the pillar 211-2 in the sub-region T11, and the width D121 of the pillar 212-1 is greater than the width D122 of the pillar 212-2. Similarly, the closer the pillar 212 is to the central region C (or the sub-region T12), the greater its width.

In some embodiments, the width of the pillar 211 in the sub-region T11 is greater than the width of the corresponding pillar 212 in the sub-region T12. For example, as shown in FIG. 2, the width D111 of the pillar 211-1 in the sub-region T11 may be greater than the width D121 of the pillar 212-1 in the sub-region T12, and the width D112 of the pillar 211-2 in the sub-region T11 may be greater than the width D122 of the pillar 212-2 in the sub-region T12, but the present disclosure is not limited thereto.

In some embodiments, the meta-structure 20 further includes a plurality of pillars 213 in the sub-region T13. Each pillar 213 may include the same or similar materials as the pillar 211 or the pillar 212. Besides, as shown in FIG. 2, the pillars 213 in the sub-region T13 may have a pitch of P13.

In some embodiments, two adjacent pillars 213 (e.g., the pillar 213-1 and the pillar 213-2) have a pitch of P13, and the pitch P13 is greater than the pitch P12. Here, the pitch P13 may be defined as the distance from the central axis of one pillar 213 to the central axis of the adjacent pillar 213.

Similarly, in the cross-sectional view of the optical device 100 along the radial direction R of the optical device 100 (e.g., the cross-sectional view of the optical device 100 shown in FIG. 2), there are four pillars 213 in the sub-region T13, but the present disclosure is not limited thereto.

In some embodiments, in the cross-sectional view of the optical device 100 along the radial direction R of the optical device 100 (e.g., the cross-sectional view of the optical device 100 shown in FIG. 2), the sub-region T13 has a region width of W13, and the region width W13 is greater than the region width W12.

In some embodiments, in the cross-sectional view of the optical device 100 along the radial direction R of the optical device 100 (e.g., the cross-sectional view of the optical device 100 shown in FIG. 2), the pillars 213 in the sub-region T13 have different widths.

In some embodiments, as shown in FIG. 2, the pillar 213-1 in the sub-region T13 corresponds to the pillar 212-1 in the sub-region T12 (or the pillar 211-1 in the sub-region T11), the pillar 213-2 in the sub-region T13 corresponds to the pillar 212-2 in the sub-region T12 (or the pillar 211-2 in the sub-region T11), and the width D131 of the pillar 213-1 is greater than the width D132 of the pillar 213-2. That is, the closer the pillar 213 is to the central region C, the greater its width.

In some embodiments, the width of the pillar 212 in the sub-region T12 is greater than the width of the corresponding pillar 213 in the sub-region T13. For example, as shown in FIG. 2, the width D121 of the pillar 212-1 in the sub-region T12 may be greater than the width D131 of the pillar 213-1 in the sub-region T13, and the width D122 of the pillar 212-2 in the sub-region T12 may be greater than the width D132 of the pillar 213-2 in the sub-region T13, but the present disclosure is not limited thereto.

Referring to FIG. 2, in some embodiments, the optical device 100 further include a protective layer 30 disposed on the substrate 10 and the meta-structure 20 for protecting the meta-structure 20. In more detail, as shown in FIG. 2, the protective layer 30 may be disposed on and between the pillars 211, the pillars 212, and the pillars 213 of the meta-structure 20, but the present disclosure is not limited thereto.

In some embodiments, the refractive index of the protective layer 30 may be less than the refractive index of the pillars 211, the pillars 212, and the pillars 213 of the meta-structure 20. For example, the refractive index of the protective layer 30 may be between about 1.2 and about 1.7, and the protective layer 30 may include organic materials (e.g., PMMA, PDMS, PMP), $SiO_2$, MgO, $Al_2O_3$, $GeO_2$, BeO, any other applicable material, or a combination thereof, but the present disclosure is not limited thereto.

In some other embodiments, the refractive index of the protective layer 30 may be greater than the refractive index of the pillars 211, the pillars 212, and the pillars 213 of the meta-structure 20. For example, the refractive index of the protective layer 30 may be between about 2.0 and about 5.2, and the protective layer 30 may include SiN, $TiO_2$, SiH, GaN, $HfO_2$, GaP, InP, GaSe, PbTe, PbSe, any other applicable material, or a combination thereof, but the present disclosure is not limited thereto.

Referring to FIG. 1, in some embodiments, the optical device 100 also has a second-type region T2 between the central region C and the first-type region T1. For example, the second-type region T2 may be located in the edge (peripheral) region of the optical device 100 and adjacent to the first-type region T1.

In some embodiments, the second-type region T2 includes a plurality of sub-regions. For example, as shown in FIG. 3, the second-type region T2 may include a sub-region T21 and a sub-region T22 between the central region C and the sub-region T21, but the present disclosure is not limited thereto. The number of sub-regions of the second-type region T2 may be, for example, about sixty, which may be determined according to actual needs or the process limits.

Referring to FIG. 3, in some embodiments, the meta-structure 20 further includes a plurality of pillars 221 in the sub-region T21 and a plurality of pillars 222 in the sub-region T22. As shown in FIG. 3, the pillars 221 in the sub-region T21 may have a pitch of P21, and the pillars 222 in the sub-region T22 may have a pitch of P22.

In some embodiments, two adjacent pillars 221 (e.g., the pillar 221-1 and the pillar 221-2) have a pitch of P21, two adjacent pillars 222 (e.g., the pillar 222-1 and the pillar 222-2) have a pitch of P22, and the pitch P22 is greater than the pitch P21. Here, the pitch P21 may be defined as the distance from the central axis of one pillar 221 to the central axis of the adjacent pillar 221. Similarly, the pitch P22 may be defined as the distance from the central axis of one pillar 222 to the central axis of the adjacent pillar 222.

In some embodiments, in the cross-sectional view of the optical device 100 along the radial direction R of the optical device 100 (e.g., the cross-sectional view of the optical device 100 shown in FIG. 3), each sub-region of the second-type region T2 has the same number of pillars. Moreover, in some embodiments, the number of pillars in each sub-region of the second-type region T2 is greater than the number of pillars in each sub-region of the first-type region T1. For example, as shown in FIG. 3, there are five pillars 221 in the sub-region T21, and there are five pillars 222 in the sub-region T22, but the present disclosure is not limited thereto.

In some embodiments, in the cross-sectional view of the optical device 100 along the radial direction R of the optical device 100 (e.g., the cross-sectional view of the optical device 100 shown in FIG. 3), the sub-region T21 has a region width of W21, the sub-region T22 has a region width of W22, and the region width W22 is greater than the region width W21.

In some embodiments, in the cross-sectional view of the optical device 100 along the radial direction R of the optical device 100 (e.g., the cross-sectional view of the optical device 100 shown in FIG. 3), the pillars 221 in the sub-region T21 have different widths, and the pillars 222 in the sub-region T22 have different widths.

In some embodiments, as shown in FIG. 3, the pillar 221-1 is closer to the sub-region T22 than the pillar 221-2, and the width D211 of the pillar 221-1 is greater than the width D212 of the pillar 221-2. That is, the closer the pillar 221 is to the central region C (or the sub-region T22), the greater its width.

In some embodiments, as shown in FIG. 3, the pillar 222-1 in the sub-region T22 corresponds to the pillar 221-1 in the sub-region T21, the pillar 222-2 in the sub-region T22 corresponds to the pillar 221-2 in the sub-region T21, and the width D221 of the pillar 222-1 is greater than the width D222 of the pillar 222-2. Similarly, the closer the pillar 222 is to the central region C, the greater its width.

In some embodiments, the width of the pillar 221 in the sub-region T21 is greater than the width of the corresponding pillar 222 in the sub-region T22. For example, as shown in FIG. 3, the width D211 of the pillar 221-1 in the sub-region T21 may be greater than the width D221 of the pillar 222-1 in the sub-region T22, and the width D212 of the pillar 221-2 in the sub-region T21 may be greater than the width D222 of the pillar 222-2 in the sub-region T22, but the present disclosure is not limited thereto. Furthermore, in some embodiments, the width D221 of the pillar 221-1 shown in FIG. 3 is greater than the width D111 of the pillar 211-1 shown in FIG. 2. That is, the maximum width of the pillars 221 is greater than the maximum width of the pillars 211.

Similarly, as shown in FIG. 3, the protective layer 30 may be disposed on and between the pillars 221 and the pillars 222 of the meta-structure 20, but the present disclosure is not limited thereto.

In the embodiments of the present disclosure, the different pitches of different sub-regions, the region widths of different sub-regions, or different widths of pillars in each sub-region of the first-type region T1 and the second-type region T2 may be defined for a specific deflection angle of light, so that the efficiency of light-collection of the optical device may be effectively enhanced.

Figure 4:
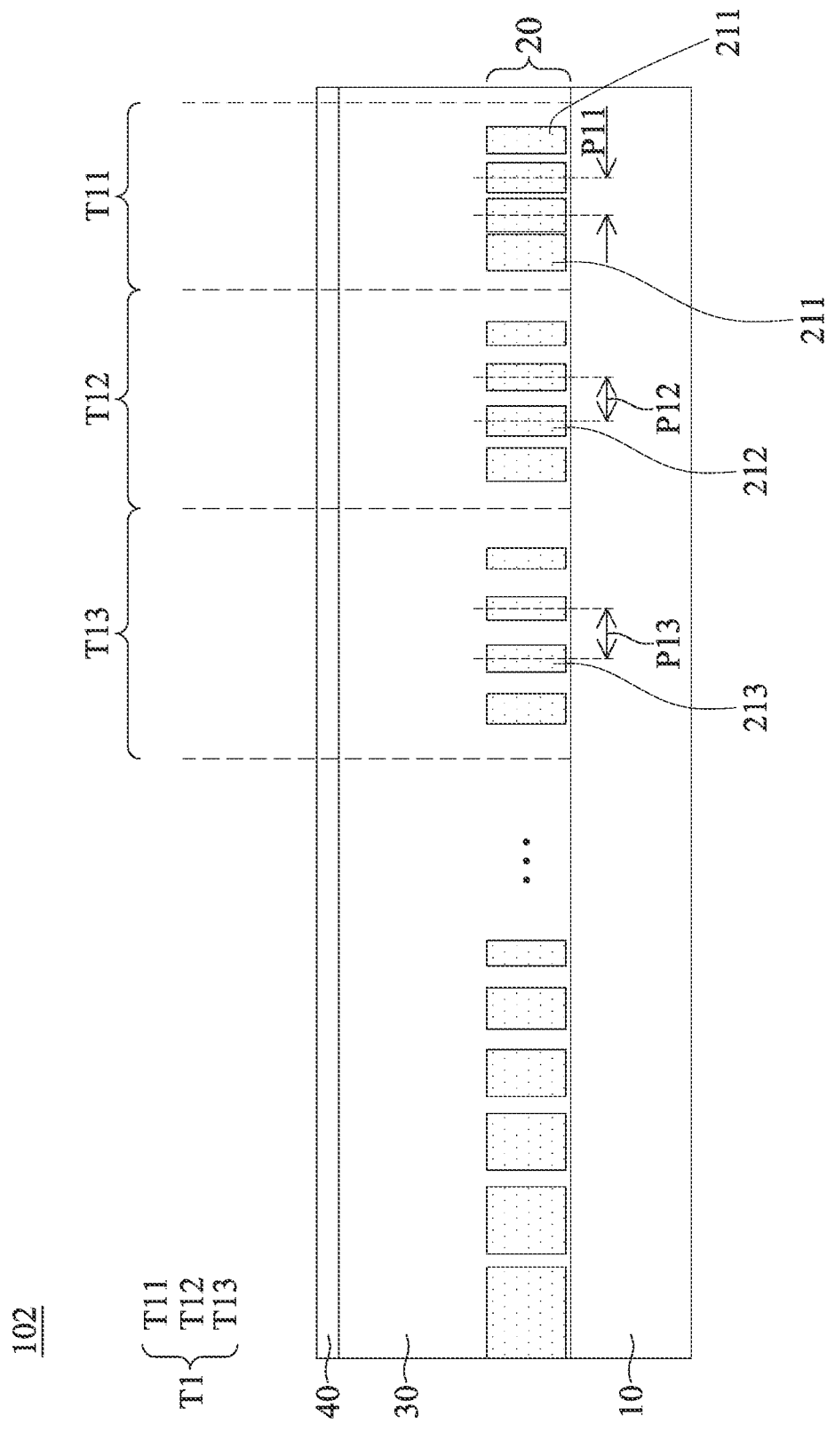
FIG. 4 is a partial cross-sectional view illustrating an optical device according to another embodiment of the present disclosure.

FIG. 4 is a partial cross-sectional view illustrating an optical device 102 according to another embodiment of the present disclosure. The top view of the optical device 102 may be similar to the optical device 100 shown in FIG. 1. That is, FIG. 4 may be a partial cross-sectional view of the optical device along line A-A', but the present disclosure is not limited thereto. Similarly, some components of the optical device 102 may be omitted in FIG. 4, for the sake of brevity.

In some embodiments, the optical device 102 includes a substrate 10. The optical device 102 also includes a meta-structure 20 disposed on the substrate 10. The meta-structure includes pillars 211 in the sub-region T11, pillars 212 in the sub-region T12, and pillars 213 in the sub-region T13. In the cross-sectional view of the optical device 102 along a radial direction of the optical device 102 (e.g., the sectional view of the optical device 102 shown in FIG. 4), two adjacent pillars 211 have a pitch of P11, two adjacent pillars 212 have a pitch of P12, two adjacent pillars 213 have a pitch of P13, the pitch P13 is greater than the pitch P12, and the pitch P12 is greater than the pitch P11.

Referring to FIG. 4, in some embodiments, the optical device 102 further includes an antireflection layer 40 disposed on the meta-structure 20. For example, the antireflection layer 40 may include an antireflection coating (ARC), a multi-film, or a grating layer, but the present disclosure is not limited thereto.

In some embodiments, as shown in FIG. 4, the optical device 102 further includes a protective layer 30 disposed between the substrate 10 and the antireflection layer 40 for protecting the meta-structure 20. In more detail, the antireflection layer 40 may improve transmission of the interface of the protective layer 30 (e.g., polymer) and the air.

Figure 5:
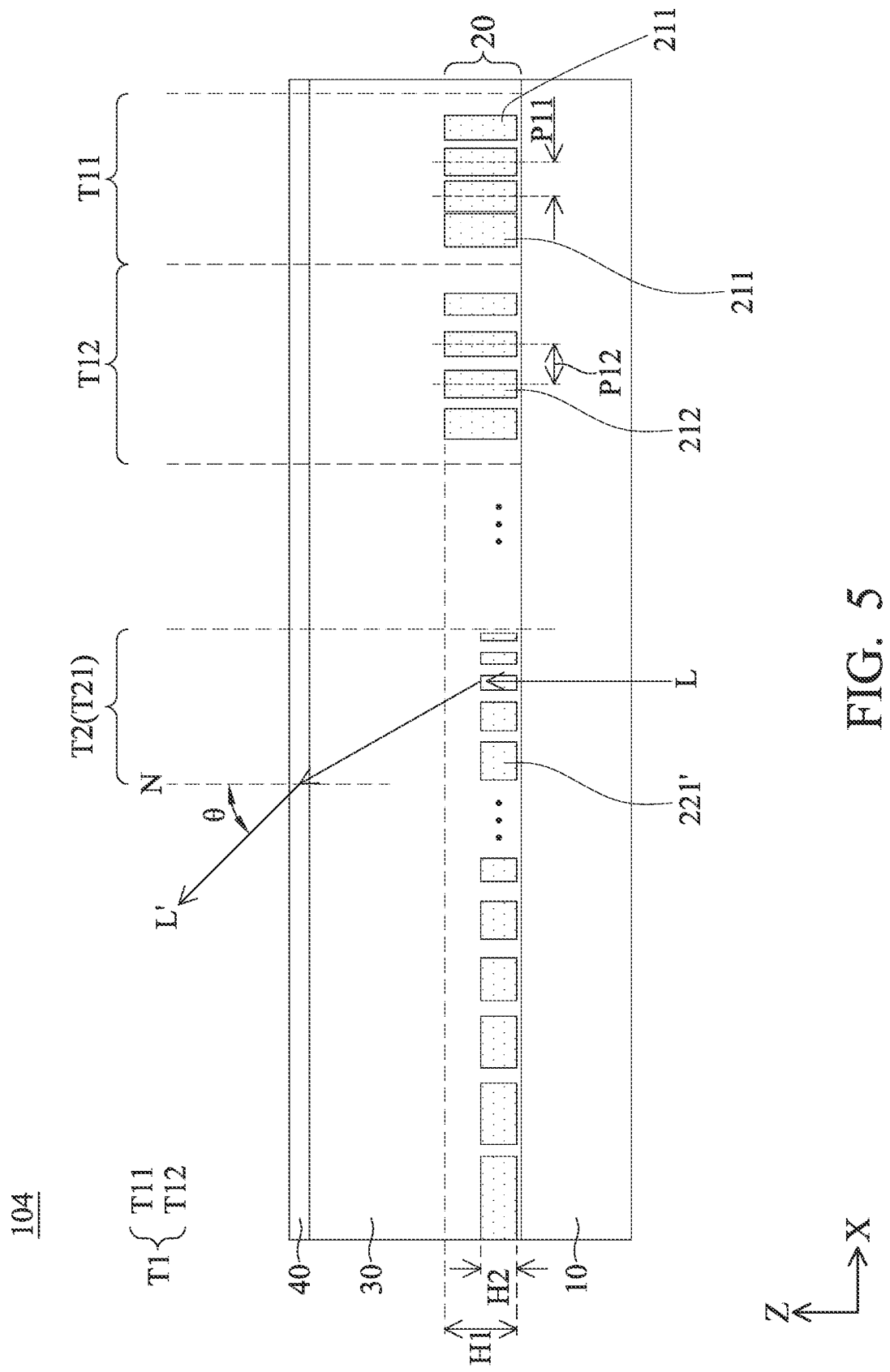
FIG. 5 is a partial cross-sectional view illustrating an optical device according to another embodiment of the present disclosure.

FIG. 5 is a partial cross-sectional view illustrating an optical device 104 according to another embodiment of the present disclosure. The top view of the optical device 104 may be similar to the optical device 100 shown in FIG. 1. That is, FIG. 4 may be a partial cross-sectional view of the optical device along line A-A', but the present disclosure is not limited thereto. Similarly, some components of the optical device 104 may be omitted in FIG. 4, for the sake of brevity.

In some embodiments, the height of each pillar in the second-type region T2 is lower than the height of each pillar in the first-type region T1. For example, as shown in FIG. 5, the height H2 of each pillar 221' in the sub-region T21 of the second-type region T2 may be lower than the height H1 of each pillar 211 in the sub-region T11 and each pillar 212 in the sub-region T12 of the first-type region T1, but the present disclosure is not limited thereto. For example, the height H1 of each pillar 211 in the sub-region T11 and each pillar 212 in the sub-region T12 of the first-type region T1 may be in the range from about 0.5 μm to about 1.0 μm, but the present disclosure is not limited thereto.

Referring to FIG. 5, in some embodiments, light L vertically entering the second-type region T2 (e.g., the sub-region T21) deviates from the normal line N of the optical device 104 by 15 degrees or less after passing through the second-type region T2. That is, the included angle θ between the emitting light L' and the normal line N of the optical device 104 may be in the range from 0 to about 15 degrees, but the present disclosure is not limited thereto.

In the forgoing embodiments, the meta-structures may include a plurality of pillars in the central region C (not shown), but the present disclosure is not limited thereto. In some other embodiments, a Fresnel lens is disposed adjacent to the meta-structure 20, and the Fresnel lens is located in the central region C.

In summary, in the embodiments of the present disclosure, the different pitches of different sub-regions, the region widths of different sub-regions, or different widths of pillars in each sub-region of the first-type region and the second-type region may be defined for a specific deflection angle of light, so that the efficiency of light-collection of the optical device may be effectively enhanced.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. An optical device having a central region and a first-type region surrounding the central region, wherein the first-type region comprises a first sub-region and a second sub-region between the central region and the first sub-region, and the optical device comprises:
    a substrate; and
    a meta-structure disposed on the substrate, wherein the meta-structure comprises:
        a plurality of first pillars in the first sub-region; and
        a plurality of second pillars in the second sub-region,
        wherein in a cross-sectional view of the optical device along a radial direction of the optical device, adjacent two of the first pillars have a first pitch, adjacent two of the second pillars have a second pitch, and the second pitch is greater than the first pitch,
    wherein the optical device further has a second-type region between the central region and the first-type region, and the second-type region comprises third sub-regions, and the meta-structure further comprises:
    a plurality of third pillars in each of the third sub-regions,
        wherein in the cross-sectional view of the optical device along the radial direction of the optical device, a top of each of the third pillars is lower than a top of each of the first pillars and each of the second pillars.

2. The optical device as claimed in claim 1, wherein in the cross-sectional view of the optical device along the radial direction of the optical device, a number of the first pillars is the same as a number of the second pillars.

3. The optical device as claimed in claim 1, wherein in the cross-sectional view of the optical device along the radial direction of the optical device, the first sub-region has a first region width, the second sub-region has a second region width, and the second region width is greater than the first region width.

4. The optical device as claimed in claim 1, wherein in the cross-sectional view of the optical device along the radial direction of the optical device, the first pillars have different widths, and the second pillars have different widths.

5. The optical device as claimed in claim 4, wherein a width of each of the first pillars decreases in a direction from the central region to a peripheral region of the optical device.

6. The optical device as claimed in claim 5, wherein a width of each of the second pillars decreases in the direction from the central region to the peripheral region of the optical device.

7. The optical device as claimed in claim 6, wherein the width of the second pillar that is the first in the direction from the central region to the peripheral region of the optical device is smaller than the width of the first pillar that is the first in the direction from the central region to the peripheral region of the optical device.

8. The optical device as claimed in claim 6, wherein the width of the second pillar that is the second in the direction from the central region to the peripheral region of the optical device is smaller than the width of the first pillar that is the second in the direction from the central region to the peripheral region of the optical device.

9. The optical device as claimed in claim 1, wherein in the cross-sectional view of the optical device along the radial direction of the optical device, a number of the third pillars in each of the third sub-regions is greater than a number of the first pillars and a number of the second pillars.

10. The optical device as claimed in claim 1, wherein in the cross-sectional view of the optical device along the radial direction of the optical device, the third pillars in each of the third sub-regions have different widths.

11. The optical device as claimed in claim 1, wherein in the cross-sectional view of the optical device along the radial direction of the optical device, a maximum width of the third pillars is greater than a maximum width of the first pillars.

12. The optical device as claimed in claim 1, wherein a light vertically entering the second-type region deviates from a normal line of the optical device by 15 degrees or less after passing through the second-type region.

13. The optical device as claimed in claim 1, wherein a number of the first pillars and a number of the second pillars are equal to or greater than four.

14. The optical device as claimed in claim 1, further comprising:
   a Fresnel lens disposed in the central region.

15. The optical device as claimed in claim 1, further comprising:
   an antireflection layer disposed on the meta-structure.

16. The optical device as claimed in claim 15, further comprising:
   a protective layer disposed between the substrate and the antireflection layer.

\* \* \* \* \*